United States Patent [19]
Hummel et al.

[11] Patent Number: 5,696,203
[45] Date of Patent: Dec. 9, 1997

[54] PROCESS FOR PRODUCING POLYOLEFIN GRAFTED COPOLYMERS

[75] Inventors: Albert A. Hummel, Elkton; Adolfo Brusaferro, Perryville, both of Md.; Roberto Rinaldi, Mantova, Italy

[73] Assignee: Montell North America Inc., Wilmington, Del.

[21] Appl. No.: 683,999

[22] Filed: Jul. 19, 1996

[51] Int. Cl.⁶ .................................................. C08G 63/91
[52] U.S. Cl. ............................ 525/53; 525/193; 525/243
[58] Field of Search ............................ 525/53, 193, 243

[56] References Cited

U.S. PATENT DOCUMENTS

| | | | |
|---|---|---|---|
| 4,990,558 | 2/1991 | Denicola, Jr. et al. | 524/504 |
| 5,140,074 | 8/1992 | Denicola, Jr. et al. | 525/263 |
| 5,286,791 | 2/1994 | Denicola, Jr. et al. | 525/71 |
| 5,310,794 | 5/1994 | Denicola, Jr. et al. | 525/71 |
| 5,370,813 | 12/1994 | Denicola, Jr. et al. | 525/68 |
| 5,411,994 | 5/1995 | Galli et al. | 521/50.5 |
| 5,447,985 | 9/1995 | Denicola, Jr. et al. | 524/534 |
| 5,473,015 | 12/1995 | Denicola, Jr. et al. | 525/71 |

FOREIGN PATENT DOCUMENTS 4435534  4/1996  Germany.

*Primary Examiner*—Thomas R. Weber

[57] ABSTRACT

A gas phase process for producing olefin polymer graft copolymers, including providing a reaction apparatus having first and second reaction zones operatively connected to each other into which particles of an olefin polymer and a free-radical polymerizable monomer are fed while maintaining free-radical polymerization conditions and a substantial non-oxidizing environment in said zones and from which the grafted copolymer product is discharged. An apparatus suitable for practicing this process is also disclosed.

18 Claims, 2 Drawing Sheets

PROCESS FOR PRODUCING POLYOLEFIN GRAFTED COPOLYMERS

FIELD OF THE INVENTION

The present invention relates to a process for producing polyolefin grafted copolymers in a gas phase process, said process being carried out in two interconnected reaction zones operating under conditions such that a circulation of polymer is established between the two polymerization zones.

BACKGROUND OF THE INVENTION

Polyolefin grafted copolymers represent an interesting class of copolymers because they may have some properties typical of the grafted polymer and at the same time some properties typical of the polyolefin backbone. It is known that certain physico-mechanical properties of polyolefins can be improved by blending with e.g. amorphous polymers such as polystyrene. However, physical blends of such polymers are generally incompatible, owing to the high surface tension and poor adhesion between the immiscible polymers in the blend. For this reason, physical blends require the use of a compatibilizer to reduce the above-mentioned problems.

Better results with respect to the physical blends are obtained when the modifying (co)polymer is "chemically" blended with the polyolefin, i.e. when the modifying (co)polymer is grafted onto the polyolefin backbone. When compared to physical blends of polymers, graft copolymers usually exhibit a finer heterophasic morphology in which the domain size of the dispersed phase is resistant to coalescence in subsequent processing and may be smaller by about one order of magnitude. In addition, the necessary adhesion between the polyolefin backbone polymer and the modifying grafted (co)polymer derives from the chemical covalent bond between the backbone polymer and the graft (co)polymer rather than on the action of an external compatibilizing agent. Depending on the intended results, different types of polymerizable monomers can be used for the preparation of the grafted (co)polymer, including e.g. styrene and in general aromatic vinyl compounds, acrylic compounds, acrylonitrile, etc.

Polyolefin grafted copolymers can be used as stand-alone structural plastic or can be blended with other grafted or ungrafted polymers to further improve or provide additional properties. Examples of olefin polymer graft copolymers and blends prepared therefrom are described e.g. in U.S. Pat. Nos. 4,990,558, 5,370,813, 5,473,015, 5,310,794, 5,286,791, 5,447,985.

Graft copolymers can be prepared by creating active sites on the main olefin polymer chain or backbone, and initiating graft polymerization of a polymerizable monomer at these sites. Procedures which have been used for introducing such active sites into the backbone have included treatment with organic chemical compounds, such as peroxide or azo compounds, capable of generating free radicals, and irradiation.

Of the various processes which have been employed for preparing polyolefin grafted copolymers, the so called "dry" process, such as is carried out in a mechanically stirred reactor, and this gas phase process are more efficient than the processes which use a liquid suspending medium or solvent because of its high conversion, reduced by-product formation, reduced environmental impact and lower manufacturing costs. The gas phase process of this invention also provides process simplicity, reduced fouling, improved mixing between the ingredients, and high heat transfer surface per unit reaction volume.

A method of producing olefin polymer graft copolymers, which overcomes the above problems, is described in U.S. Pat. No. 5,140,074. In said method, the grafting reaction is controlled, inter alia, by maintaining the rate of addition of the grafting monomer below 4.5 pph (parts by weight per 100 parts by weight of the polyolefin material) per minute. The grafting reaction is an exothermic reaction and is carried out in a conventional stirred reactor where heat transfer becomes the parameter which limits the ability to maintain good temperature control and productivity.

This heat transfer problem becomes magnified as you increase the size of the reactor since the surface to volume ratio gets smaller as you increase the size of the vessel in a gas phase process as there is no suspending or solvent medium to aid the heat transfer. Further, the faster you feed the monomer(s) to the reactor, the faster the heat is generated and the greater the heat transfer problems.

Another problem occurring in grafting reactions carried out in mechanically stirred reactors, derives from the effect of the agitator impacting the polymer particles, which contributes to fines formation and consequent fouling caused by the presence of dead zones with poor mixing action.

SUMMARY OF THE INVENTION

The present invention provides a gas phase process for producing polyolefin grafted copolymers, carried out in a first and in a second interconnected reaction zones, into which particles of an olefin polymer and a free-radical polymerizable monomer are fed while maintaining free-radical polymerization conditions and a substantial non-oxidizing environment in said zones and from which the grafted copolymer product is discharged. The polymer particles flow through the first of said reaction zones under fast fluidization conditions, leave said first reaction zone through a pipe connector into a gas/solid separation means, such as a cyclone, which separates the solid particles from the gaseous material and the particles leave the gas/solid separation means and enter the second of said reaction zones through which they move in a plug flow mode by gravity, leave said second reaction zone by another pipe connector and are reintroduced into said first reaction zone, thus establishing a circulation of polymer between the two reaction zones. The process is carried out essentially in the absence of any solvent or liquid dispersing medium. The olefin polymer to be grafted is added in solid particulate form and the monomer(s) and initiator(s) are typically added in liquid phase.

BRIEF DESCRIPTION OF THE DRAWINGS

The invention is described with reference to the attached drawings, which are given for illustrative purposes without limiting the invention, in which.

DETAILED DESCRIPTION

As is known, the fast fluidization condition is obtained when the velocity of the fluidizing gas is higher than the transport velocity, and it is characterized in that the pressure gradient along the direction of transport is a monotonic function of the quantity of injected solid, for equal flow rate and density of the fluidizing gas. Transport velocity refers to the gas velocity necessary to entrain the solids in a gas stream. The terms "transport velocity" and "fast fluidization condition" are well known in the art; see, "D. Geldart, Gas Fluidization Technology, page 155 et seq., J. Wiley & Sons Ltd., 1986", the disclosures of which are incorporated herein by reference. In the second reaction zone, where the polymer flows in a plug flow mode under the action of gravity, high values of density of solid are reached (density of solid=Kg of polymer per $m^3$ of reactor occupied by polymer) which approach the bulk density of the polymer; a positive gain in pressure can be obtained along the direction of flow, so that it becomes possible to reintroduce the polymer into the first reaction zone without the need of mechanical means. In this way, a "loop" circulation is established, which is defined by the balance of pressure between the two reaction zones and by the head loss or pressure drop introduced into the system.

"Plug flow mode" means particles moving in a vertical direction downward without back mixing.

Figure 1:
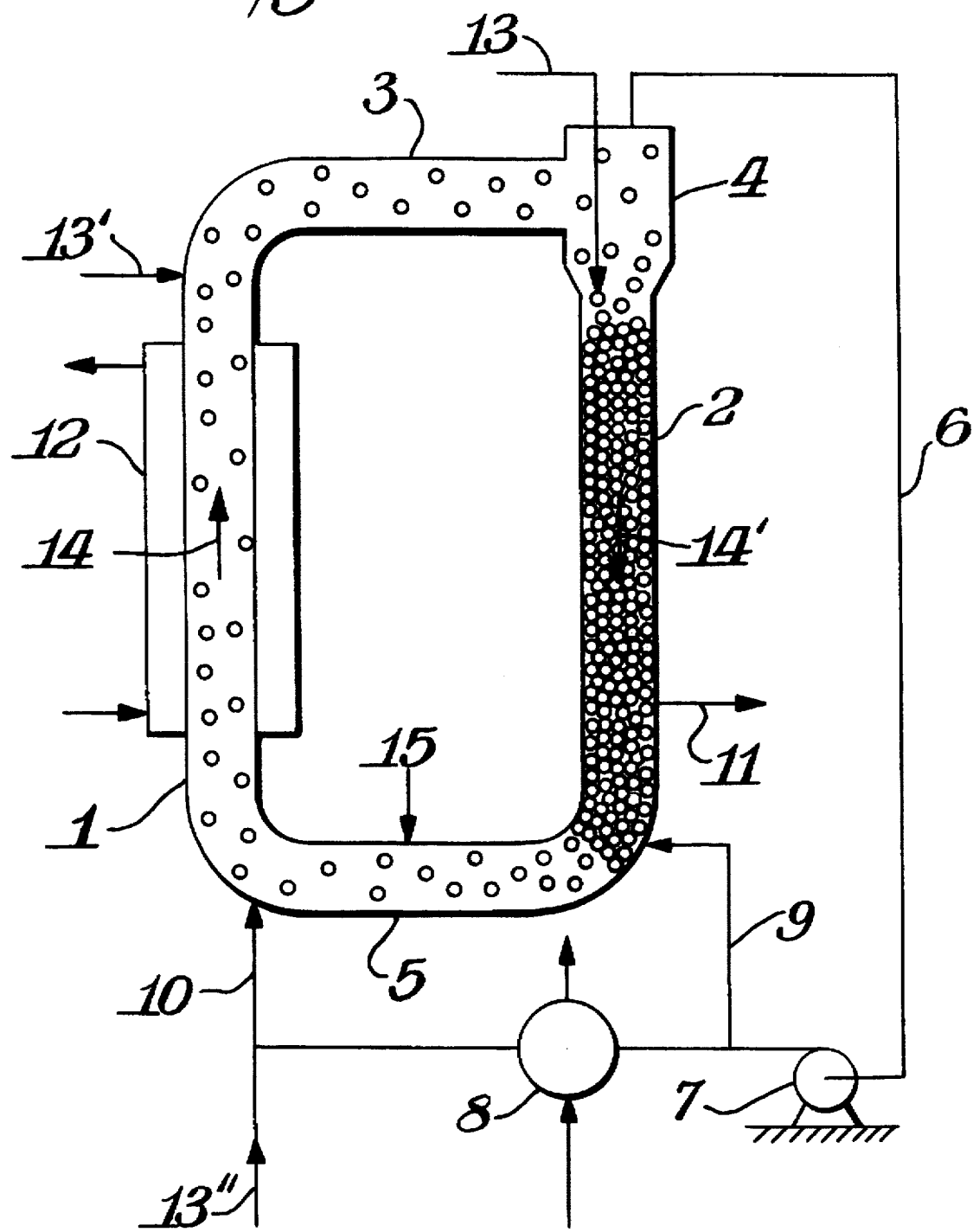
FIG. 1 is a diagrammatic representation of the process according to the invention.

Referring to FIG. 1, the polymer particles flow through the first reaction zone 1 under fast fluidization conditions along the direction of the arrow 14; in the second reaction zone 2, the polymer particles move in a plug flow mode under the action of gravity along the direction of the arrow 14'. The two reaction zones 1 and 2 are appropriately interconnected by the sections 3 and 5.

The fast fluidization conditions of zone 1 are primarily for mixing and heat transfer. Typically the residence time in zone 1 is at least 10 times less than in zone 2. Thus, on a per pass basis the amount of grafting is relatively small. The plug flow mode of zone 2 is where the majority of the grafting reaction takes place. Hence the residence time in zone 2 must be sufficient for the absorption and diffusion of the monomer and, if used, initiator into and onto the polymer particles.

Generally, the condition of fast fluidization in the first reaction zone 1 is established by feeding a mixture comprising an oxidatively inert gas and monomer(s) polymerizable under free radical conditions to said zone 1, through line 10, at velocities higher than the transport velocity. The feeding of this mixture is effected below the point of reintroduction of the polymer into said first zone 1. Where appropriate, a gas distribution means, such as, for example, a distributor grid, can be used.

The fluidizing gas mixture generally comprises one or more gases which are oxidatively inert to free radicals, nitrogen being the preferred gas. Oxidatively inert saturated aliphatic hydrocarbons, such as propane and butane, in gaseous form may also be used. In that case, the gaseous hydrocarbons could condense on the internal surfaces of zone 1 depending on operating pressure and revaporized to aid in heat removal. The preferred hydrocarbon is propane.

The velocity of the fluidizing gas injected in the first reaction zone is higher than the transport velocity under the operating conditions and is preferably between 2 and 15 m/s, more preferably between 5 and 12 m/s. The circulation of the copolymer particles between the two reaction zones can be effected by controlling the amount of copolymer leaving the second reaction zone 2, using means suitable for controlling the flow of solids, such as, for example, mechanical valves (slide valve, V-ball valve, etc.) or non mechanical valves (L valve, J valve, reverse seal, etc.).

Generally, the copolymer particles and the gaseous mixture leaving the first reaction zone 1 are conveyed to a solid/gas separation zone 4. The separation of the fluidizing gas from the solid polymer particles can be effected using conventional separation means such as, for example, a separator of the inertial type or preferably of centrifugal type, or a combination of the two. The centrifugal separator (cyclone) can be of the axial, spiral, helical or tangential type.

From the separation zone 4, the copolymer particles enter the second reaction zone 2. The gas leaving the separation zone 4 is compressed and transferred to the first reaction zone 1. The transfer is carried out by means of a gas-recycle line 6, equipped with means for compression 7 and optionally for heat exchange 8. A portion of the gas leaving the separation zone 4 can be transferred, after having been compressed, to the connection section 5 via the line 9, in order to control the transfer of copolymer from the second to the first reaction zone.

The residence time in connections 3 and 5 is negligible.

The grafting monomer and the initiator can be fed at any point of the reaction zones 1 or 2, as well as at any point of the connection sections 3 and 5. Grafting monomer and initiator, together or separately, are preferably fed either to the first or second reaction zones, for example in the second reaction zone through the line 13. They can also be fed, together or separately, to the first reaction zone (line 13') or to the recycle line 6 (line 13"). It is also possible to feed the grafting monomer to one reaction zone or connection section and the initiator to another reaction zone or connection section. When two or more grafting monomers are used they can be fed, together or separately, to the same or different reaction zone or connection section. Solvents or diluents, which are inert with respect to the olefin polymer and are not polymerizable under free-radical conditions, can be used to dilute/dissolve the free-radical polymerizable monomer (grafting monomer) and/or the initiator during the feeding to the reaction system.

The polyolefin, which is the substrate of the grafting reaction, can be fed at any point of the reaction zones 1 and 2, as well as at any point of the connection sections 3 and 5. Preferably it is fed to the connection section 5 via line 15.

In a continuous process, average residence time is the amount of polymer in the reactor divided by the rate of product discharged. The solid circulation rate is controlled in order to maintain a maximum temperature difference between the inlet and outlet of reaction zone 2.

As described previously, graft copolymers can be prepared by creating active sites in the polyolefin backbone and then initiating graft polymerization of polymerizable monomer(s) at these sites. In the process of the present invention, besides using an initiator to create active sites, such active sites can be introduced in the olefin polymer via irradiation, using, for instance, the process described in U.S. Pat. No. 5,411,994. In such a case, the procedure comprises irradiating a mass of polyolefin particles with high-energy ionizing radiation to create free-radical sites in the polyolefin. The irradiated polyolefin is then conveyed, while maintaining a non-oxidizing environment, from the radiation chamber to any of the reaction zones or connection sections, preferably to the first reaction zone 1 or to the connection section 5.

Active sites on the polyolefin can also be generated outside the reaction zones by pretreating the polyolefin with an initiator before its introduction in any of the reaction zones or connection sections. In this case the procedure comprises treating a mass of olefin polymer with an initiator in a separate pre-treatment zone, for instance a vessel. The treated polyolefin is then conveyed, while maintaining a non-oxidizing environment, from the pre-treatment zone to any of the reaction zones or connection sections, preferably to the first reaction zone 1 or to the connection section 5.

Figure 2:
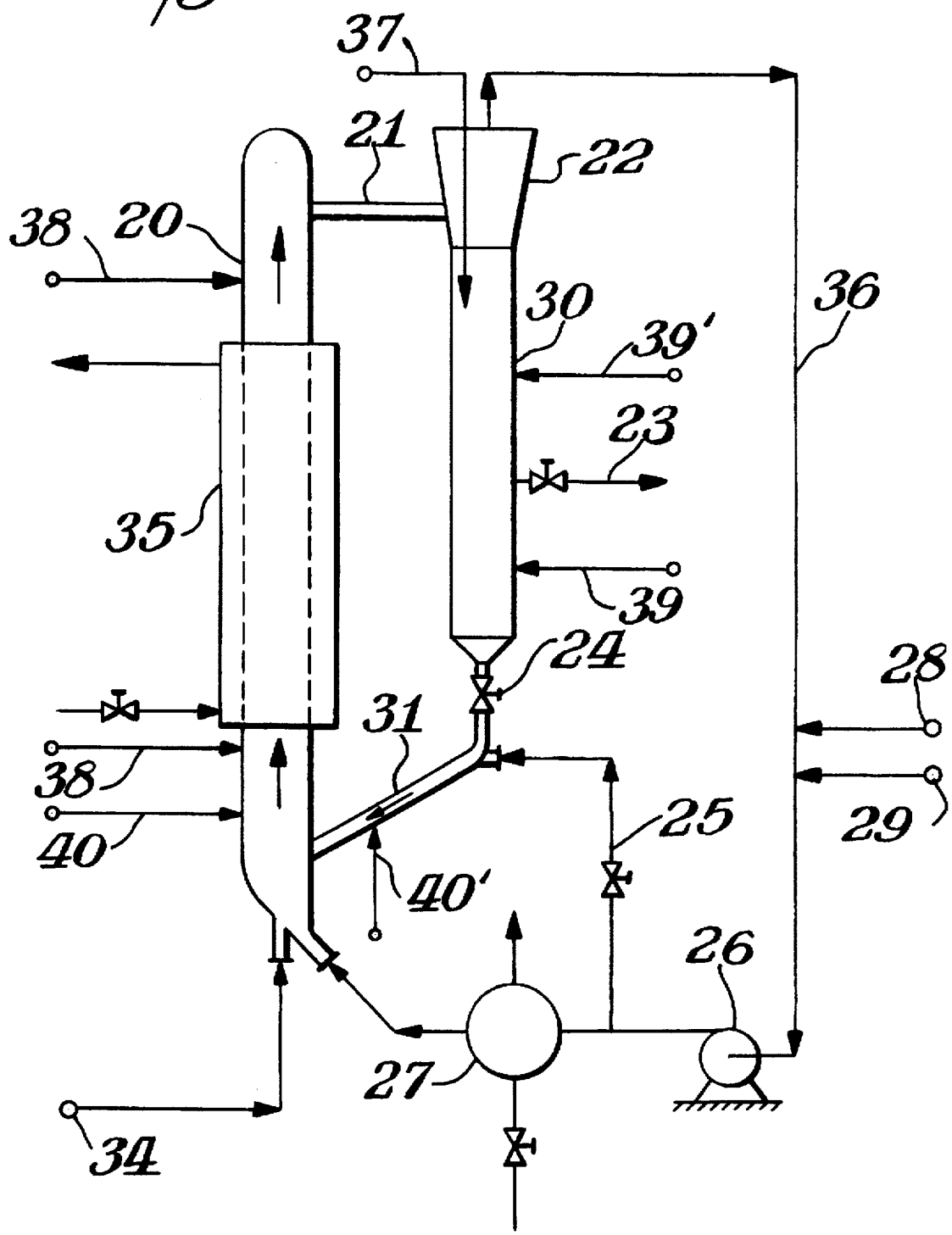
FIG. 2 is a diagrammatic representation of an embodiment of the process according to the invention.

Temperature control in the reaction zones can be achieved by using external heat exchangers 12 suitably positioned on the surfaces of the reaction zone 1. Where convenient, additional or alternative heat exchange surfaces can be present in the interior or exterior of the reaction zones, e.g. a heat exchanger on the gas recycle line as indicated in FIG. 2.

The polymer concentration in the reaction zones can be monitored by the usual methods known in the state of the art, for example by measuring the differential pressure between two suitable points along the axis of the reaction zones or measuring the density by nuclear detectors (for example γ-ray).

Polymer product is discharged from the second reaction zone via line 11. Advantageously, the polymer can be discharged from one or more points where the solids density is higher, for example from suitable points in the second reaction zone where large amounts of densified flowing polymer are available, in order to minimize the quantity of entrained gas. By inserting a controlled valve at a suitable point upstream of the exit region of the polymer from the second reaction zone, it is possible to continuously control the withdrawal of the polymer produced, while limiting the amount of gas accompanying the polymer. In the gas process of the present invention, there are no "dead zones" since all internal surfaces are thoroughly flushed by the moving solid particles. This sweeping action of the moving solid particles is the primary reason why this process provides reduced fouling as compared to other processes, such as mechanically agitated reactors and fluidized beds.

When the grafting reaction is completed, the polyolefin grafted copolymer is treated to deactivate the residual free radicals and to remove any unreacted monomer.

The process of the present invention can be carried out in continuous, semi-continuous or batch mode. In continuous or semi-continuous mode, the polymer monomer(s) and, if used, initiator(s) are fed in a continuous or semi-continuous manner and polymer is discharged in a continuous or semi-continuous manner.

The temperature used in the grafting reaction when an initiator is used, is typically from 60° to 125° C., preferably from 80° and 125° C., and when irradiation is used, it is typically from 10° and 100° C., preferably from 10° and 70° C.

The olefin polymer material useful in the practice of the method of this invention for making graft copolymers of polyolefin is (a) a homopolymer of a linear or branched $C_2$–$C_8$ α-olefin; (b) a random copolymer of a linear or branched $C_2$–$C_8$ α-olefin with a different olefin selected from the group consisting of $C_2$–$C_{10}$ α-olefins, provided that, when the different olefin is ethylene, the maximum polymerized ethylene content is about 10% preferably about 4%, by weight; when the olefin is propylene and the different olefin is a $C_4$–$C_{10}$ α-olefin, the maximum polymerized content thereof is about 20%, preferably about 16%, by weight; and when the olefin is ethylene and the different olefin is a $C_3$–$C_{10}$ α-olefin, the maximum polymerized content thereof is about 10%, preferably about 5%, by weight; (c) a random terpolymer of a linear or branched $C_3$–$C_8$ α-olefin and two different olefins selected from the group consisting of ethylene and $C_4$–$C_8$ α-olefins, provided that the maximum polymerized content of the different $C_4$–$C_8$ α-olefins is about 20%, preferably about 16%, by weight, and, when ethylene is one of the different olefins, the maximum polymerized ethylene content is about 5%, preferably about 4%, by weight; or (d) a homopolymer of (a) or a random copolymer of (b) which is impact-modified with about from 10 to 60% of (i) an ethylene-propylene rubber having an ethylene content of about 7 to 70%, preferably about from 7 to 40%, most preferably about from 10 to 40%, (ii) and ethylene/butene-1 copolymer rubber (EBR) having an ethylene content of from 30 to 70%, (iii) a propylene/butene-1 copolymer rubber (PBR) having a butene-1 content of from 30 to 70%, (iv) an ethylene-propylene-nonconjugated diene monomer rubber (EPDM) having an ethylene content of 30 to 70% and diene content of from 1 to 10%, (v) an ethylene/propylene/butene terpolymer rubber (EPBR) having a propylene content of from 1 to 10% and butene content of from 30 to 70% or a propylene content from 30 to 70% and butene content of from 1 to 10%.

The $C_2$–$C_8$ α-olefins which can be used in the preparation of the olefin polymer materials as described above include, for example, ethylene, propylene, 1-butene, isobutylene, 3-methyl-1-butene, 3,4-dimethyl-1-butene, 1-pentene, 4-methyl-1-pentene, 1-hexene, 3-methyl-1-hexene, 1-heptene and the like. Propylene and 1-butene are the preferred $C_3$–$C_8$ α-olefin monomers.

$C_3$–$C_{10}$ α-olefins which can be used in the preparation of the olefin polymer materials as described above include linear and branched olefins such as those listed above for the $C_{2-8}$ α-olefins which have at least 3 carbon atoms. When the olefin polymer is an ethylene homopolymer, it typically has a density of 0.91 g/cm$^3$ or greater, and when the olefin polymer is an ethylene copolymer with a $C_3$–$C_{10}$ alpha-olefin, it typically has a density of 0.88 g/cm$^3$ or greater. Suitable ethylene copolymers include ethylene/1-butene, ethylene/hexene-1 and ethylene/4-methyl-1-pentene. The ethylene copolymer can be a HDPE or a LLDPE, and the ethylene homopolymer can be a HDPE or a LDPE. Typically the LLDPE and LDPE have density of 0.91 g/cm$^3$ or greater and the HDPE have a density of 0.95 g/cm$^3$ or greater. The impact-modified olefin polymer can be prepared by first polymerizing a $C_2$–$C_8$ α-olefin to form a homopolymer of said olefin, or copolymerizing such an olefin with a different olefin selected from $C_2$–$C_{10}$ α-olefins, and then polymerizing the relevant monomers to form the rubber in the presence of said homopolymer or copolymer in a reactor or series of reactors. Alternatively, mechanical blends can be prepared by separately polymerizing 1) the particular olefin to form the homo- or copolymer and 2) the relevant monomers to form the rubber, and then physically mixing the homo- or copolymer with the rubber until a homogeneous blend is obtained. Reactor blends are preferred when an impact-modified olefin polymer is used.

Homopolymers of butene-1, HDPE and LLDPE are preferred. Homopolymers, random copolymers, random terpolymers, and impact-modified homopolymers and copolymers of propylene are also preferred and are the most preferred olefin polymer materials for use in the present process and are referred to herein, individually or collectively, as propylene polymer materials. Suitable particulate forms of the olefin polymer material used in the present method include powder, flake, granulate, spherical, cubic and the like. Spherical particular forms are preferred. The pore volume fraction of the particles can be as low as about 0.04, but it is preferred that the grafting be effected on polyolefin particles having a pore volume fraction of at least 0.07. Most preferably, the polyolefin used in the present method will have a pore volume fraction of at least about 0.12, and most preferably at least about 0.20 with more than 40%, preferably more than 50%, and most preferably more than 90%, of the pores having a diameter larger than 1 micron, a surface area of at least 0.1 m²/g, and a weight average diameter of about from 0.4 to 7 mm. In the preferred polymer, grafting takes place in the interior of the particulate material as well as on the external surface thereof, resulting in a substantially uniform distribution of the graft polymer throughout the olefin polymer particle.

The free-radical-generating polymerization initiator has a decomposition half-life at the temperature employed of about from 1 to 240, preferably about from 5 to 100, and most preferably about from 10 to 40, minutes. Organic peroxides, and especially those which generate alkoxy radicals, constitute the preferred class of initiators. These include acyl peroxides, such as benzoyl and dibenzoyl peroxides; dialkyl and aralkyl peroxides, such as di-tert-butyl peroxide, dicumyl peroxide, cumyl butyl peroxide, 1,1-ditert-butylperoxy-3,5,5-trimethylcyclohexane, 2,5-dimethyl-2,5-di-tert-butylperoxy-hexane, and bis(alpha-tertbutylperoxyisopropylbenzene); peroxy esters, such as tert-butylperoxypivalate, tert-butylperbenzoate, 2,5-dimethylhexyl 2,5-di(perbenzoate), tert-butyl di(perphthalate), tert-butyl-peroxy-2-ethyl hexanoate; and 1,1-dimethyl-3-hydroxybutylperoxy-2-ethyl hexanoate; and peroxy carbonates, such as di(2-ethylhexyl) peroxy dicarbonate, di(n-propyl)peroxy dicarbonate, and di(4-tert-butylcyclohexyl)peroxy dicarbonate. Azo compounds, such as azobisisobutyronitrile, also may be used. Two or more initiators having the same or different half-lives may be employed.

The initiator, if a liquid at the decomposition temperature used, may be used neat or in solution. If a solid at the decomposition temperature used, it may be dissolved in a suitable liquid solvent. The concentration of the initiator in solution typically should be about from 5% to 98% by weight. Peroxide initiators are available in hydrocarbon solutions at a concentration of about from 12.5 to 75 weight %. Whether neat or in solution, the active concentration of the initiator per se should be about from 0.1 to 6.0 pph, preferably about form 0.2 to 3.0 pph, to assure the generation of a sufficient number of free radical sites on and in the olefin polymer material.

When the irradiation method is used, the irradiation conditions are, for example, those described in U.S. Pat. No. 5,411,994, which method is incorporated herein by reference.

The free radical polymerizable monomers useful in accordance with this invention may be any monomeric vinyl compound capable of being polymerized by free radicals wherein the vinyl radical, H₂C=CR—, in which R=H or methyl, is attached to a straight or branched aliphatic chain or to a substituted or unsubstituted aromatic, heterocyclic, or alicyclic ring in a mono- or polycyclic compound. Typical substituent groups may be alkyl hydroxyalkyl, aryl, and halogen. The vinyl monomer may be a member of one of the following classes: (1) vinyl-substituted aromatic, heterocyclic, or alicyclic compounds, including styrene, vinylnaphthalene, vinylpyridine, vinylpyrrolidone, vinylcarbazole, and homologs thereof, e.g., alpha- and para-methylstyrene, methylchlorostyrene, p-tert-butylstyrene, methylvinyl-pyridine, and ethylvinylpyridine; (2) vinyl esters of aromatic and saturated aliphatic carboxylic acids, including vinyl formate, vinyl acetate, vinyl chloracetate, vinyl cyanoacetate, vinyl propionate, and vinyl benzoate; and (3) unsaturated aliphatic nitriles and carboxylic acids and their derivatives, including acrylonitrile, methacrylonitrile, acrylamide, methacrylamide, acrylic acid, acrylate esters, such as the methyl, ethyl, hydroxy-ethyl, 2-ethylhexyl, and butyl acrylate esters, methacrylic acid, ethacrylic acid, and methacrylic esters, such as the methyl, ethyl, butyl, benzyl, phenylethyl, phenoxyethyl, epoxypropyl, and hydroxypropyl methacrylate esters, maleic anhydride, and N-phenyl maleimide. Free radical polymerizable dienes, such as butadiene, isoprene and their derivatives, also can be used. Two or more monomers from the same or different classes may be employed.

Of the various vinyl monomers that can be used, styrene, acrylonitrile, methacrylic acid, methyl acrylate, methyl methacrylate and mixtures thereof are preferred. When mixtures are employed, the use of maleic anhydride and/or alpha-methyl styrene as comonomer(s) together with at least one other monomer with which both copolymerize are also preferred. Two or more monomers may be grafted simultaneously onto the olefin polymer material by the present process to produce different homopolymer or copolymer grafts or both on the olefin polymer backbone depending on the relative reactivity of the monomers employed. Alpha-methylstyrene and maleic anhydride will graft, but do not readily homopolymerize. Hence they must be used in combination with another vinyl compound, such as styrene, with which they copolymerize and which is capable of free radical-initiated polymerization. The grafting monomer, if liquid at room temperature, can be used neat or on combination with a solvent or diluent which is inert with respect to the particulate polymer material and is not polymerizable by free radicals. If a solid at room temperature, the grafting monomer can be used in solution in a solvent therefor which is inert as set forth above. Mixtures of neat monomer, diluted monomer, and/or dissolved monomer can be used. In all cases, whether or not a solvent or diluent is present, the amount of grafting monomer is from about 5 to about 240 parts by weight per 100 parts by weight of olefin polymer material. This amount is based on the actual monomer content.

In the process of the invention the particulate polyolefin is maintained in a substantially non-oxidizing atmosphere, e.g., under inert gas, during such time that free radicals are present therein. The olefin polymer material is also maintained in such an atmosphere during the formation of the free radicals. The reason for this is that, upon exposure to an oxidizing atmosphere such as air, the free radicals are converted to peroxy radicals, which visbreak or degrade the polymer material thereby causing substantial reduction in molecular weight with a concomitant increase in melt flow rate. Moreover, with essentially all monomers, the presence of large amounts of air during the treatment with monomer interferes with the graft polymerization per se. Therefore, the treatment of the polymer with the grafting monomer is carried out in a substantially non-oxidizing atmosphere, as are the subsequent steps of the method. The expression "substantially non-oxidizing", when used herein to describe the environment or atmosphere to which the olefin polymer material is exposed, means an environment in which the active-oxygen concentration, i.e., the concentration of oxygen in a form that will react with the free radicals in the polymer material, is less than about 15%, preferably less than about 5%, and most preferably less than about 1%, by volume. The most preferred concentration of active oxygen is 0.004% or lower by volume. Within these limits, the non-oxidizing atmosphere can be any gas, or mixture of gases, which is oxidatively inert toward the free radicals in the olefin polymer material, e.g., nitrogen, argon, helium, and carbon dioxide.

At the end of the grafting reaction, the polyolefin grafted copolymer is treated, preferably by heating and maintaining a non-oxidizing environment, so as to deactivate substantially completely all of the residual free radical therein. This substantially completely eliminates the possibility of the formation of peroxy radicals in the graft copolymer upon its exposure to air, which radicals can cause visbreaking or degradation of the polymer. In most instances, the deactivation temperature will be at least about 110° C., preferably at least about 120° C. While temperatures as high as 250° C. can be used, it is preferred to select a deactivation temperature which is below the melting point of the grafted copolymer, for example at temperature below 150° C. for polypropylene grafted copolymer. Heating at the deactivation temperature for at least about 20 minutes generally is satisfactory. Free-radical deactivation can also be accomplished by the use of an additive, e.g. methyl mercaptan, that function as a free radical trap.

Any unreacted vinyl monomer is removed from the graft copolymer either before or after radical deactivation or at the same time as deactivation. If the removal is effected before or during deactivation, a substantially non-oxidizing environment is maintained. In one preferred embodiment, the monomer is stripped out from the grafted copolymer in a nitrogen or other inert gas purge at the selected temperature. In a continuous process the graft copolymer may be transferred to a fluid bed or to a fast fluidized loop and deactivated by heating at the selected temperature while the exiting gas is cooled to condense most of the monomer (typically up to about 99 wt. %) carried out in the gas purge.

The process of the present invention can be combined with other polymerization technology in a fully integrated plant for producing graft copolymers and their polymeric alloys. For instance, the polyolefin substrate can be prepared in an olefin polymerization step upstream of the grafting step. The polyolefin polymer discharged from the olefin polymerization reactor(s) can be directly fed to the grafting reaction step, particularly when the olefin polymerization is carried out in the gas-phase. After the grafting reaction and the deactivation/monomer removal steps are completed, the polyolefin grafted copolymer can be conveyed to a subsequent location where further grafting and/or polymerization reactions are carried out.

The process according to the present invention has many advantages. The loop configuration allows the adoption of relatively simple reactor geometries. In practice, each reaction zone can be designed as a cylindrical reactor of high aspect ratio (length/diameter ratio). The first reaction zone where the polymer flows under fast fluidization conditions is characterized by a high surface/volume ratio. A significant cooling surface is therefore available for direct heat exchange and hence, with maximum heat transfer between the cooling liquid in the heat exchanger and the reaction system. The high turbulence connected with the fast fluidization conditions assures in every case a very high heat transfer coefficient, thus overcoming the heat transfer problems of the prior art processes. The strong radial and axial mixing of the polymer due to the fast fluidization conditions removes any possible condensation on the internal wall and creates a highly homogenized system with enhanced dispersion of grafting monomer and initiator into the polyolefin particles. Because of the excellent heat transfer capabilities of the gas phase system of this invention, feed rates as high as 5 pph/min can be used in this reaction system, with higher rates being within the broadest ambit of this invention. Faster residence time and higher specific productivity (hourly output per unit volume of the reactor) with respect to the conventional mechanically stirred reactor processes are achieved, with consequent reduction of investment and manufacturing costs. The high mixing efficiency, the loop configuration with solids kept in continuous movement thereby avoiding dead zones, and the absence of mechanical mixing means, such as a stirrer, makes it possible to essentially avoid or substantially reduce the fouling phenomena.

Moreover, the relatively simple reactor geometry allows the adoption of high operating pressures, which are not economical in the conventional gas-phase processes.

In addition to the above advantages, the process of the present invention opens new possibilities in terms of control of the quality of the obtained product. It is known that the product quality is affected by parameters such as chain length and amount of grafted vinyl polymer, average molecular weight and mount of dispersed vinyl polymer, and, when two or more grafting monomer are used, composition of the resultant copolymer.

The process of the present invention is much more flexible with respect to the prior art processes. For example, one can control the gas phase composition and the kinetic conditions by feeding the grafting monomer(s) at different points of the reaction zones and/or with different feed rates.

Another embodiment of the process of the present invention is set forth in FIG. 2. The first reaction zone, where the polymer flows under fast fluidization conditions, includes a first cylindrical reactor 20; the second reaction zone, where the polymer moves in a plug flow mode, includes a second cylindrical reactor 30. The upper region of the reactor 20 is connected by a first line 21 to a solid/gas separator 22, which in turn is connected to the upper region of the reactor 30. The lower region of the reactor 30 is connected by a second line 31 to the lower region of the reactor 20. The solid/gas separator 22 is connected by means of a gas-recycle line 36 to the first reactor 20 in a region at the bottom of said reactor 20 below the point of entry of the second line 31. A first valve 24 for controlling the polymer flow rate is generally inserted between the reactor 30 and the line 31. This valve 24 can be either of the mechanical or non-mechanical type. Preferably the valve 24 is a "L" valve operated by the gas taken from the recycle line 36 through line 25. Advantageously, the recycle line 36 is equipped with a compressor 26, a heat exchanger system 27 and system for introducing, either together or separately, monomer(s) 28 and initiator(s) 29. Monomer(s) and/or initiator(s) can also be fed, together or separately, to the top of the reactor 30, via line 37, or to the bottom of reactor 20, via line 34. They can also be fed to one or more points of the reactor 20, for examples via lines 38 and/or 38', as well as to one or more points of the reactor 30, for example via lines 39 and/or 39'. Polymer can be discharged, for example, from reactor 30 via line 23. Preferably the first line 21 leaves the upper region of reactor 20 laterally, it having been observed that a lateral exit of the solid/gas mixture from the reactor 20 contributes to the dynamic stability of the entire reaction system. The upper region of the reactor 20 can have a cylindrical shape with a diameter equal to that of the said reactor 20, or can be of frustoconical geometry with the broad end uppermost. The first line 21 can be horizontal or have a slope in the direction of gravity in order to facilitate discharge of polymer. The second line 31 can be horizontal or can be inclined downwardly. The polyolefin which is the substrate of the grafting reaction can be conveniently fed to the bottom of the reactor 20 via line 40, or, preferably, to the connection line 31, via line 40'. The reactor 20 is conveniently equipped with a heat-exchanger 35.

The following examples are illustrative of the process of the present invention.

EXAMPLES

General Procedures

The experiments were carried out in a reaction system having a set-up as described in FIG. 2, operating in a batch mode. The reaction system, which is described with reference to FIG. 2, consisted of two cylindrical metal reactors 20 (having an inside diameter (I.D.) of 2") and 30 (having an I.D. of 4") connected by pipes 21 and 31. Fast fluidization in the reactor 20 was achieved by recycling gas from the gas/solid separator 22 to the bottom of the reactor 20, via a gas-recycle line 36. The gas-recycle line was equipped with a compressor 26. Velocity of the fluidizing gas was kept at about 6 m/sec. Nitrogen was used as fluidizing gas. Circulation of polymer was controlled via "L" valve 24 operated by a stream of gas 25 taken from the recycle line 36. The plant was charged with a particulate polyolefin before the start of an experiment and the entire apparatus was nitrogen-purged for 45 minutes, to a level of $O_2$ undetectable by an oxygen monitor (<40 ppm). A premix of monomer and initiator was then fed, at fixed feed rates, to the top of the reactor 30, via line 37. Temperature control was achieved by controlling the oil temperature in the heat exchanger 35. Pressure was maintained at an average of 10 psig during operation. Total reaction time was feed time plus 30 minutes at reaction temperature. Free radical deactivation and drying were accomplished with 30% purge of heated once through nitrogen for 1 hour. The resulting olefin polymer grafted copolymer was pelletized using a Brabender extruder at 232° C. and 60 r.p.m., with 0.1% by weight of calcium stearate and 0.2% B225 stabilizer (1:1 mixture of Irganox 1010 hindered phenolic stabilizer and Irgafos 168 phosphite stabilizer commercially available from Ciba-Geigy). Composition was determined by IR; melt flow rate (MFR) of the polyolefin grafted copolymer as well as of the starting polyolefin was determined at 230° C. with 3.8 kg weight (ASTM D-1238, Condition I). The pore volume fraction values given herein were determined by a mercury porosimetry technique in which the volume of mercury absorbed by the particle is measured. The volume of mercury absorbed corresponds to the volume of the pores.

Examples 1–7

The examples were carried out using, as starting polyolefin, two different types of porous polypropylene (KP010 product having a MFR of 27 dg/min and a porosity of 0.46 cm³/g; KP120H product having a MFR of 75 dg/min and a porosity of 0.41 cm³/g, both of which are commercially available from Montell USA Inc.). Styrene was used as grafting monomer. Lupersol 11 and Lupersol PMS peroxides were used as initiators (commercially available from Elf Atochem N. A., Inc.). The operating conditions and the properties of the obtained copolymers are reported in Table 1. In said table, Feed Rate corresponds to the rate of addition, based on the styrene monomer, of the premix styrene monomer/initiator (mole ratio monomer/initiator= 105), expressed as parts by weight per 100 parts by weight of polyolefin; conversion is the % of total reacted styrene monomer based on the total amount of styrene monomer added.

In all cases fouling was non-existent or minimal, even at high feed rates; at the same time a very high styrene monomer conversion was achieved.

TABLE 1

| Ex. | PP[1] (lbs) | Peroxide[2] (g) | Monomer (g) | Feed Rate (pph/min) | Reaction Temp. (°C.) | Yield (lbs) | Total PS[3] (pph) | Conversion (%) | MFR (dg/min) | $M_w \times 10^3$ | $M_n \times 10^3$ | GE[4] (wt %) |
|---|---|---|---|---|---|---|---|---|---|---|---|---|
| 1 | 2.75 | 11.9 | 562 | 0.77 | 100 | 5.05 | 30.1 | 91.1 | 13.0 | 723 | 189 | 30.1 |
| 2 | 4.0 | 32.3 | 817 | 1.08 | 115 | 5.88 | 43.1 | 95.7 | 11.6 | 388 | 100 | 36.3 |
| 3 | 3.25 | 49.6 | 1254 | 0.92 | 115 | 5.80 | 83.6 | 98.4 | 3.0 | 381 | 86 | 31.0 |
| 4 | 4.0 | 32.5 | 817 | 1.03 | 115 | 5.40 | 41.8 | 93.0 | 23.2 | 374 | 84 | 35.6 |
| 5 | 3.25 | 49.6 | 1254 | 0.99 | 115 | 5.46 | 73.7 | 86.7 | 10.1 | 388 | 85 | 32.2 |
| 6 | 4.0 | 32.3 | 817 | 2.90 | 115 | 5.62 | 41.3 | 92.1 | | 353 | 87 | 38.5 |
| 7 | 4.0 | 32.3 | 817 | 4.58 | 115 | 5.86 | 47.0 | >100.0 | | 200 | 49 | 38.6 |

[1] = propylene homopolymer. KP010 propylene homopolymer was used in Examples 1 to 3, 6 and 7 and KP120H propylene homopolymer was used in Examples 4 and 5.
[2] Lupersol 11 peroxide (75% active) was used in Example 1 and Lupersol PMS peroxide (50% active) was used in Examples 2 to 7.
[3] Total PS = total amount of reacted styrene monomer.
[4] GE = graft efficiency.

Example 8

Following the same procedure as described in the general procedures and Examples 1 to 7, the reaction was repeated except that 95 mole % (1339 g) methyl methacrylate and 5% (60.6 g) methyl acrylate monomers premixed with 50.8 g Lupersol PMS (50% active) peroxide at a mole ratio of 120 (total monomer/initiator), and 3.25 lbs. KP010 porous propylene homopolymer were used. The target add level was 95 pph. At a reaction temperature of 115° C. and a feed rate of 1.09 pph/min, the reaction yielded 5.94 lb. of a free flowing polymer, representing a conversion of 92.2%.

Other features, advantages and embodiments of the invention disclosed herein will be readily apparent to those exercising ordinary skill after reading the foregoing disclosure. In this regard, while specific embodiments of the invention have been described in considerable detail, variations and modifications of these embodiments can be effected without departing from the spirit and scope of the invention as described and claimed.

We claim:

1. A process for producing olefin polymer graft copolymers, carried out in a first and in a second interconnected reaction zones, to which particles of an olefin polymer and at least one free-radical polymerizable monomer are fed while maintaining free-radical polymerization conditions and a substantial non-oxidizing environment in said zones and from which a grafted copolymer particulate product is discharged, wherein the graft copolymer particles flow through the first of said reaction zones under fast fluidization conditions, leave said first reaction zone and enter the second of said reaction zones through which they move in a plug flow mode by gravity, leave said second reaction zone and are reintroduced into said first reaction zone, thus establishing a circulation of polymer between the two reaction zones.

2. The process of claim 1, wherein the fast fluidization conditions are established by feeding a mixture comprising at least one free-radical polymerizable monomer and an oxidatively inert gas or a saturated aliphatic hydrocarbon to the first reaction zone, at a point below the point of reintroduction of the copolymer particles into said first reaction zone.

3. The process of claim 2 wherein the velocity of said mixture in gas phase is between 2 and 15 m/s.

4. The process of claim 1 wherein the circulation of the graft copolymer particles between the two reaction zones is effected by controlling the amount of graft copolymer leaving said second reaction zone.

5. The process of claim 2 wherein the graft copolymer particles and the mixture in gas phase leaving said first reaction zone are conveyed to a solid/gas separation zone and the graft copolymer particles leaving said solid/gas separation zone enter said second reaction zone.

6. The process of claim 5 wherein the gaseous mixture leaving said solid/gas separation zone is compressed and transferred to the first reaction zone.

7. The process of claim 6 wherein a portion of the gaseous mixture leaving said solid/gas separation zone is used for transferring the graft copolymer from the second reaction zone to the first reaction zone.

8. The process of claim 1, wherein the process is continuous.

9. The process of claim 1 wherein temperature control in the reaction zones is achieved by using an external heat exchanger.

10. The process of claim 1 wherein the free-radical initiator is a peroxide.

11. The process of claim 10 wherein the free-radical initiator and the free-radical polymerizable monomer are fed, together or separately, to any of the reaction zones.

12. The process of claim 10 wherein the polyolefin is pretreated with the initiator before its introduction in any of the reaction zones.

13. The process of claim 1 wherein the free-radical polymerization conditions are generated by irradiation.

14. The process of claim 1 wherein the polyolefin grafted copolymer product is treated to deactivate any residual free radicals and to remove any unreacted monomer.

15. The process of claim 1 wherein the olefin polymer is selected from the group consisting of homopolymers, random copolymers and terpolymers of a linear or branched $C_2$–$C_8$ α-olefin and impact-modified homopolymers and copolymers of a linear or branched $C_2$–$C_8$ α-olefin.

16. The process of claim 1 wherein the free-radical polymerizable monomer is a vinyl monomer selected from the group consisting of vinyl-substituted aromatic, heterocyclic and alicyclic compounds, unsaturated aliphatic carboxylic acids and derivatives thereof, unsaturated aliphatic nitriles, vinyl esters of aromatic and saturated aliphatic carboxylic acids, divinyl compound and mixtures thereof.

17. A process for producing olefin polymer graft copolymers, comprising providing a reaction apparatus having first and second reaction zones operatively connected to each other by connection sections, said reaction apparatus being closed to the atmosphere;

injecting an oxidatively inert fluidizing gas into said first reaction zone, thereby establishing a fluidizing gas velocity;

feeding olefin polymer particles and a free-radical polymerizable monomer to said first reaction zone;

reacting said olefin polymer particles and said free-radical polymerizable monomer to form a plurality of graft copolymer particles by either injecting a free-radical polymerization initiator into said first reaction zone, separately or admixed with the free-radical polymerizable monomer, or irradiated olefin polymer particles and said free-radical polymerizable monomer in said first reaction zone;

transporting said graft copolymer particles from said first reaction zone through said first connection section to said second reaction zone;

separating at least a portion of said fluidizing gas from said graft copolymer particles prior to permitting said particles to enter said second reaction zone;

optionally, injecting a free-radical polymerization initiator alone or admixed with free-radical polymerizable monomer into said second reaction zone;

reacting said graft copolymer particles and unreacted free-radical polymerizable monomer in said second reaction zone;

permitting at least a portion of said graft copolymer particles to enter said second connection section from said second reaction zone; and transporting said portion of said graft copolymer particles to said first reaction zone, thereby establishing a circulation of polymer particles through said first reaction zone, said first connection section, said second reaction zone, said second connection section and back to said first reaction zone.

18. The process of claim 8 wherein the grafted copolymer product is discharged continuously from the second reaction zone.

* * * * *

UNITED STATES PATENT AND TRADEMARK OFFICE
CERTIFICATE OF CORRECTION

PATENT NO. : 5,696,203
DATED       : December 9, 1997
INVENTOR(S) : Albert A. Hummel et al It is certified that error appears in the above-indentified patent and that said Letters Patent is hereby corrected as shown below:

In Figure 2, change the second occurrence of "38" to --38'--.

Signed and Sealed this

Twenty-second Day of August, 2000

Attest:

Q. TODD DICKINSON

*Attesting Officer*          *Director of Patents and Trademarks*